United States Patent
Pearce

(10) Patent No.: US 10,368,536 B2
(45) Date of Patent: Aug. 6, 2019

(54) INSECT TRAP

(71) Applicant: Joshua Kenneth Pearce, Seattle, WA (US)

(72) Inventor: Joshua Kenneth Pearce, Seattle, WA (US)

( * ) Notice: Subject to any disclaimer, the term of this patent is extended or adjusted under 35 U.S.C. 154(b) by 166 days.

(21) Appl. No.: 15/583,627

(22) Filed: May 1, 2017

(65) Prior Publication Data
US 2018/0310542 A1   Nov. 1, 2018

(51) Int. Cl.
| *A01M 1/06* | (2006.01) |
| *A01M 1/10* | (2006.01) |
| *A01M 1/02* | (2006.01) |
| *A01M 1/08* | (2006.01) |

(52) U.S. Cl.
CPC .............. *A01M 1/06* (2013.01); *A01M 1/02* (2013.01); *A01M 1/023* (2013.01); *A01M 1/08* (2013.01); *A01M 1/106* (2013.01)

(58) Field of Classification Search
CPC .......... A01M 1/02; A01M 1/023; A01M 1/04; A01M 1/06; A01M 1/08; A01M 1/106
USPC .......... 43/107, 111, 113, 122, 124, 125, 131, 43/132.1
See application file for complete search history.

(56) References Cited

U.S. PATENT DOCUMENTS

| 3,987,578 | A | 10/1976 | Rueff | |
|---|---|---|---|---|
| 4,332,100 | A | 6/1982 | Schneider | |
| 5,157,865 | A | 10/1992 | Chang | |
| 5,241,779 | A | 9/1993 | Lee | |
| 5,255,468 | A | * 10/1993 | Cheshire, Jr. | A01M 1/023 43/112 |
| 6,574,914 | B2 | 6/2003 | Smith | |
| 6,655,080 | B2 | 12/2003 | Spiro | |
| 6,718,685 | B2 | 4/2004 | Bossler | |
| 6,898,896 | B1 | 5/2005 | McBride | |
| 7,281,351 | B2 | 10/2007 | Durrand | |
| 7,774,976 | B2 | 8/2010 | Geier | |
| 8,109,036 | B1 | 2/2012 | Wilbanks | |
| 8,402,691 | B2 | 3/2013 | Coventry | |
| 8,898,953 | B2 | 12/2014 | Miller | |
| 9,049,855 | B2 | 6/2015 | Rocha | |
| 9,480,247 | B2 | 11/2016 | Beitler | |
| 9,504,241 | B2 | 11/2016 | Bernhardt | |
| 2005/0044777 | A1 | 3/2005 | Hiscox | |
| 2007/0011940 | A1 | * 1/2007 | Chen | A01M 1/02 43/113 |
| 2008/0168702 | A1 | 7/2008 | Jaffrey | |
| 2012/0066958 | A1 | 3/2012 | McGinnis | |

(Continued)

*Primary Examiner* — William V Gilbert

(57) ABSTRACT

A compact insect trap providing a liquid attractant to lure insects and a fan to draw insects into a container. The container is detachable for ease of cleaning and filling with the attractant. Insects converge near the fumes at a narrow annular passage on the perimeter of the device. An internal fan is activated by a timing circuit and provides intermittent bursts of air directed inside and towards the container. Airflow continues upwards through a screen, the fan, and expelled past a unidirectional valve near the top of the device. Nearby insects are suctioned into the container and are retained within due to the screen, thus preventing contamination of moving parts. As airflow is paused, insects are released from the screen where they fall or fly into the attractant. Other embodiments are described and shown.

10 Claims, 8 Drawing Sheets

(56) References Cited

U.S. PATENT DOCUMENTS

2014/0137462 A1\* 5/2014 Rocha ................... A01M 1/023
43/113
2017/0258068 A1\* 9/2017 Eom ....................... A01M 1/08
2018/0288992 A1\* 10/2018 Gallegos ................. A01M 1/06

\* cited by examiner

INSECT TRAP

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

Field of the Invention

This invention relates to insect trapping equipment, specifically to a device for capturing insects from a list that includes but is not limited to: fruit flies, mosquitoes, gnats, house flies, bees, and flying ants.

Prior Art

Insect traps of various shapes, sizes, and methods have been developed over the years to capture pests that invade our personal space. However, few have produced successful results while maintaining a safe, low cost, and easy-to-use product. While there are many concerns for the average homeowner, there are few if any current insect traps that resolves them all.

Many popular insect traps have relied on electrocution, which has several notable concerns. These designs are rarely intended for indoors and require high voltages that pose threats to birds and mammals. The high voltages and the questionable effects on non-insects make these traps unacceptable for many users.

Homeowners have failed to accept other insect traps due to factors stemming from their complexity. For instance, U.S. Pat. No. 8,402,691 to Coventry (2014) uses an air diffuser, air heater, and other complex components which contribute to added cost. Other traps are strictly for outdoor spaces and tend to be unsightly due to their shape and size. U.S. Pat. No. 6,898,896 to McBride et al. (2005) and U.S. Pat. No. 6,718,685 to Bossier (2004) requires the installation of carbon dioxide tanks. These complex systems typically add unwanted hassle and cost.

Many of the suction-type insect traps have failed to create a clean and simple airflow system to control insects. Insect traps such as U.S. Pat. No. 3,987,578 to Rueff (1976) have an air circulation system that draw insects through an impeller or fan. These traps have not considered the additional contamination and cleaning of the moving parts and fan blades. Other devices have used complex valves, dampers, and actuators to control the airflow. For instance, U.S. Pat. No. 9,049,855 to Rocha (2015) is dependent on two independently operable doors to effectively trap insects. Such designs fail to consider the debris or insects flowing through these movable parts which contribute to unwanted contamination, require cleaning, and may hinder performance.

As seen above many prior insect traps are not intended for the average user. Most are designed strictly for outdoor installations. Complex systems tend to rely on intricate parts and are mostly large, expensive, and prone to failure. Moving parts within the same airflow path as insects, such as levers and fans, get contaminated and need cleaning. None of these traps have effectively combined the aspects of a safe, clean, and easy-to-use device that is also economical. Thus, many insect traps have failed at being accepted by the average homeowner.

SUMMARY

In accordance to one embodiment is an automated insect trap. The trap comprises a housing with several integral parts and openings. The system is designed to lure insects near an annular-shaped opening, suction them into a container, and ensnare them within. This container is easily removed for cleaning and filling with an attractant. When activated a fan directs air and insects through the annular opening. The configuration of narrow annular opening and internal screen will ensure the device remains clean and insects remain inside. Other objectives, advantages, and features of the insect trap will become evident from the following detailed description.

DETAILED DESCRIPTION—PREFERRED EMBODIMENT

Figure 5:
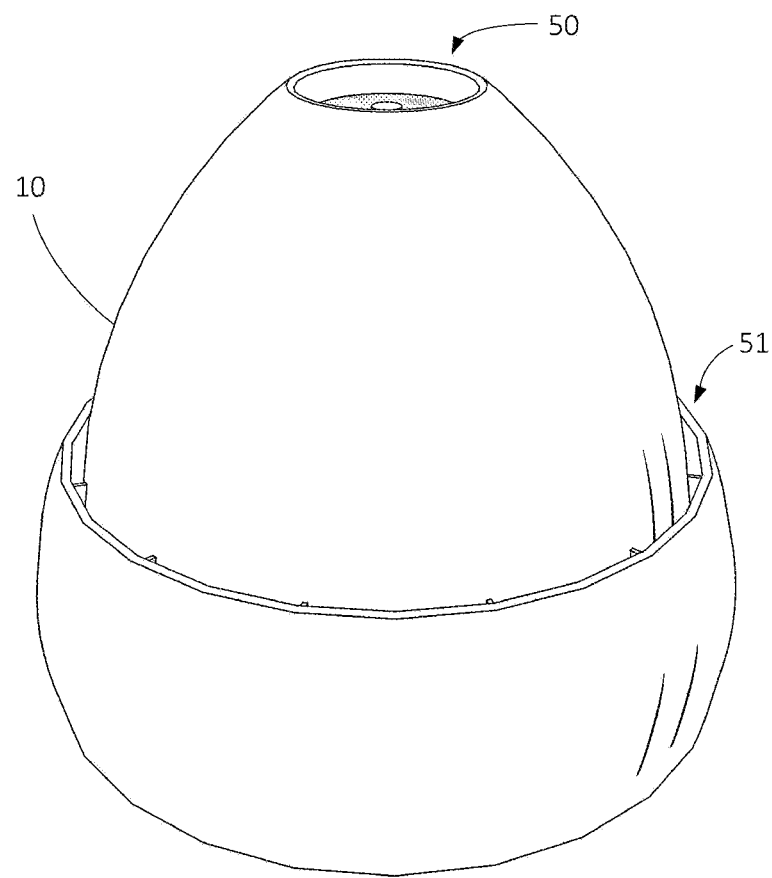
FIG. 5 is a perspective view of the first embodiment.

FIG. 5 shows a perspective view of one embodiment of my insect trap. A housing 10 constitutes the outer shell and the viewable component of the insect trap when assembled. Additional components, being connected to or contained within housing 10, are configured to provide a working and complete trap for insects.

Housing 10 is generally hemispherical in shape. However, other configurations are possible including but not limited to cylindrical, cuboid, conical, and pyramidal. The overall height of this embodiment is between 50 mm and 200 mm. Housing 10 is made from plastic, however, any material can be used including but not limited to metal and carbon fiber. This material may range in thickness from 0.5 mm to 10 mm.

Figure 1:
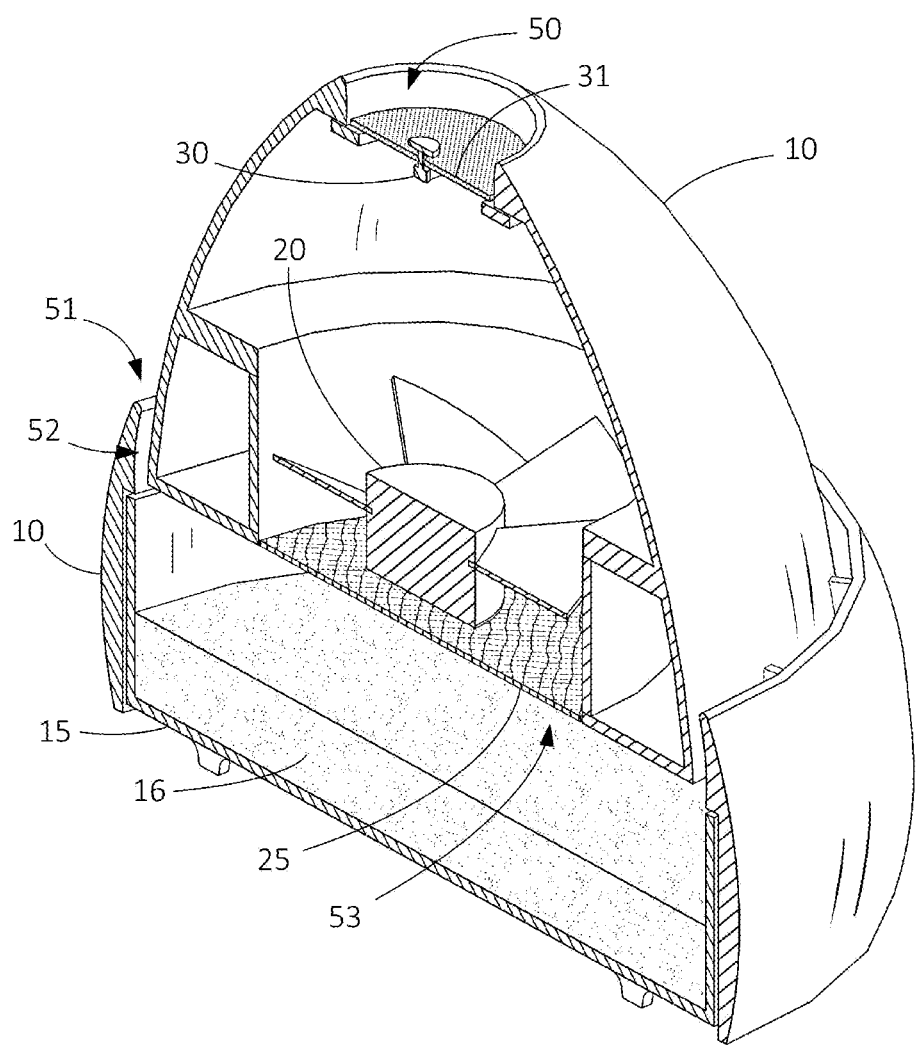
FIG. 1 is a perspective view, in longitudinal section, of the first embodiment.
Figure 2:
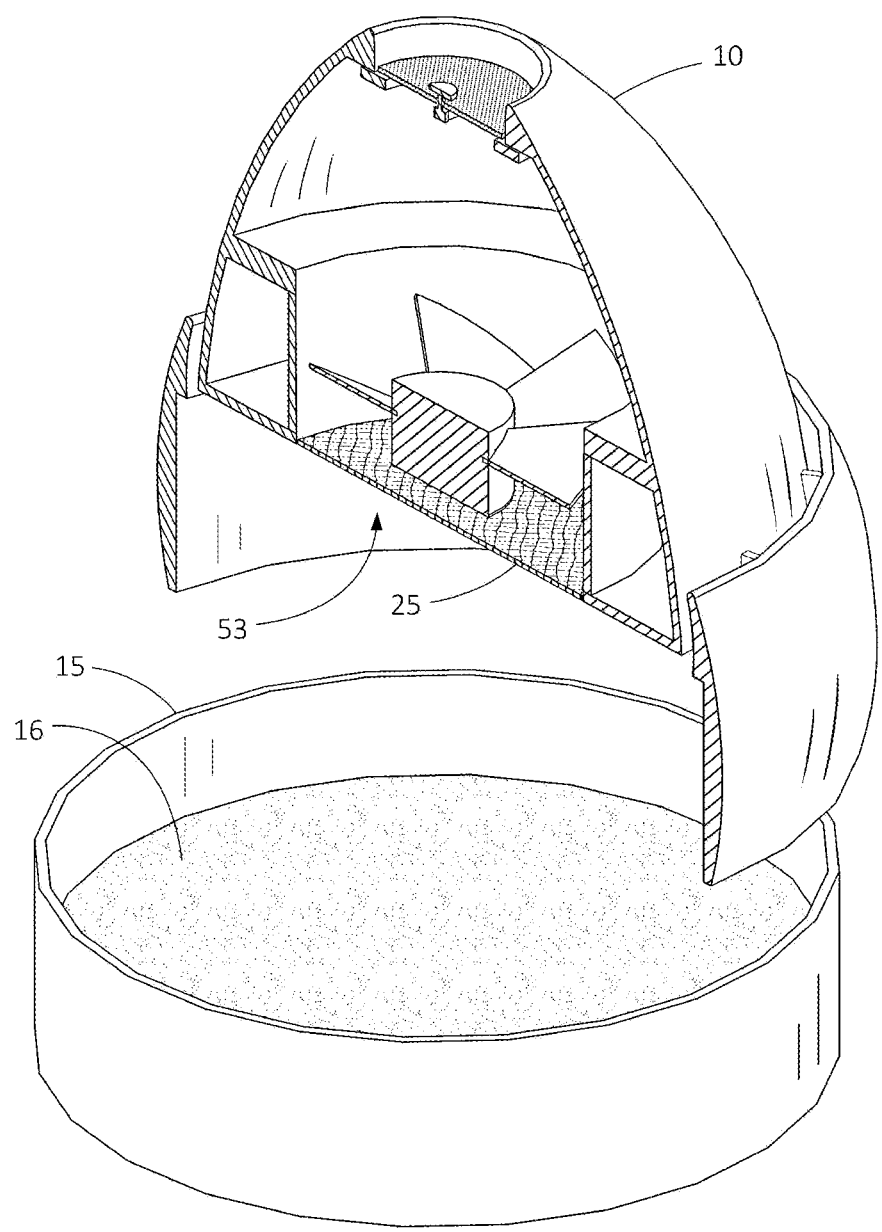
FIG. 2 is another perspective view of FIG. 1 with collection bin detached.

A container, bin, or tray 15 is removably attached to the base of housing 10 as seen in FIG. 1 (container attached) and FIG. 2 (container detached). Container 15 is defined by an open top, solid sidewalls, and solid bottom. In the first embodiment, container 15 is connected within housing 10 and removed through the bottom of housing 10. However, other embodiments allow the removal from alternate directions such as from the side. The connection of container 15 to housing 10 is configured to minimize air loss throughout the system. Additional uses of gaskets between container 15 and housing 10 may be used to prevent this air loss.

As seen in FIG. 1 and FIG. 2, a lure, odor, or attractant 16 is used within container 15. Attractant 16 can be of any liquid substance designed to lure insects through olfactory senses. Attractant 16 is additionally provided to disable the insects that land thereon. At present I contemplate attractant 16 to be acetic acid based, such as vinegar, however other materials are acceptable such as glue-based or water-based scents. Attractant 16 can imitate the scent of fruits, vegetables or animal pheromones to achieve effectiveness in luring insects. In other embodiments, the attracting source can be carbon dioxide with an additional liquid material for disabling the insects such as a glue or gel-based material.

As seen in FIG. 5 of the first embodiment, an insect opening 51 is used to access the interior of the insect trap. Insect opening 51 is annular-shaped and located on the perimeter of housing 10 and generally above container 15. As seen in an additional section view (FIG. 3) insect opening 51 connects the atmospheric air to container 15 by way of a channel or insect passage 52. In the current embodiment, this insect passage 52 is formed by housing 10. The annular width of insect opening 51 and insect passage 52 should be between 1.5 mm and 12 mm to account for various sized insects. This width being typically no smaller than the insect being trapped. In addition, the annular width should be minimal, as to maximize the airflow speed at intake opening 51.

Figure 3:
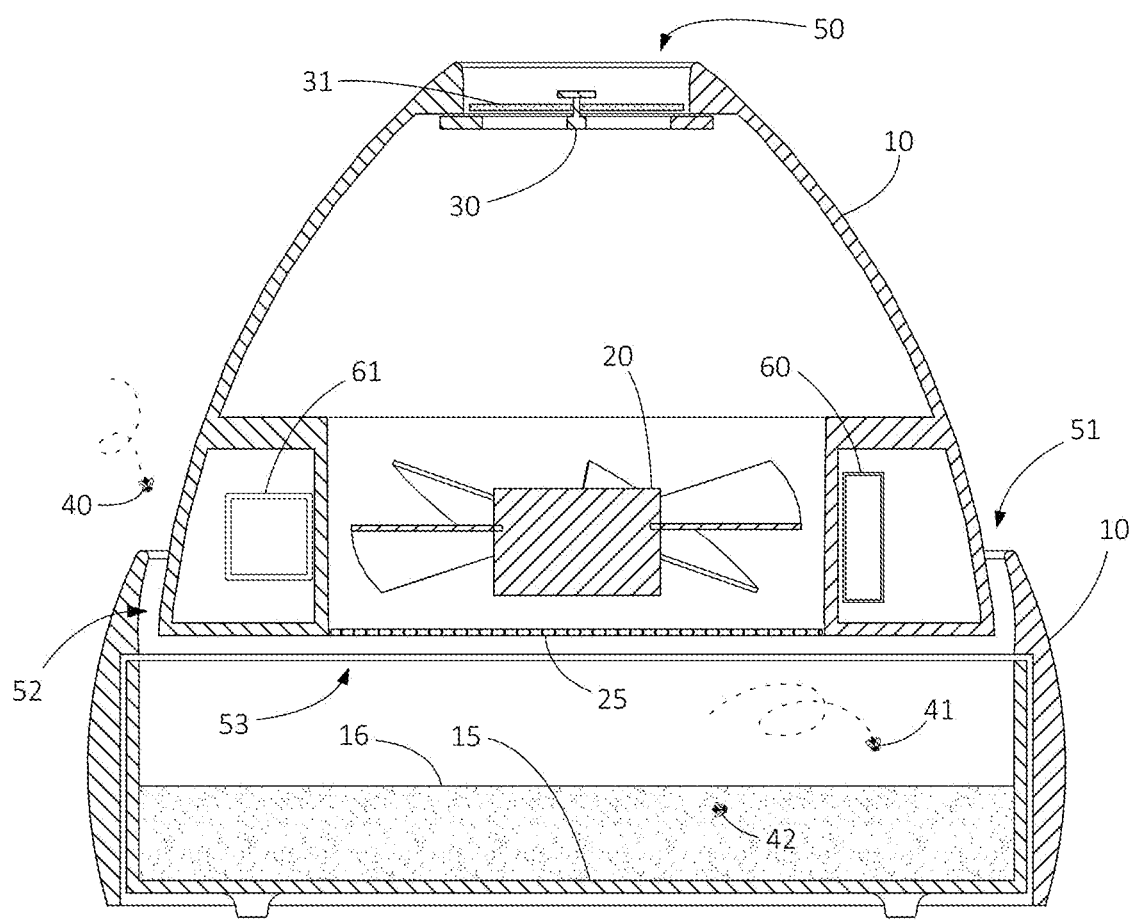
FIG. 3 is a front view, in longitudinal section, of the first embodiment with the fan motor in the inactive-state and the exhaust valve closed.

As seen in FIG. 3 insect passage 52 is generally vertical in configuration to allow maximum vapors to escape, however, other configurations may be used. When container 15 is attached to housing 10 this insect passage 52 is directed from insect opening 51 downward to the top of container 15.

Referring to FIG. 1 (perspective view) is a screen opening 53 and a screen 25. Additional views of screen opening 53 and screen 25 can be seen in FIG. 2 (container detached) and FIG. 3 (side view). Screen opening 53 is formed by housing 10 and located directly above container 15 when container 15 is attached to housing 10. The size of screen opening 53 is configured to allow maximum airflow to the interior of housing 10. Screen 25 is fixedly attached to housing 10 and fully covers screen opening 53. Screen 25 can be any netting, mesh, or permeable sheet. The permeability of screen 25 is configured to allow sufficient air to pass through and to prevent the passage of insects.

Referring to FIG. 1, a fan, blower, or other axial flow source 20 is mounted to the interior of housing 10. Fan 20 is located above screen 25 and is configured to pull air upwards through screen 25 and into the interior of housing 10.

Referring to FIG. 1, an exhaust opening 50 is formed by housing 10 and located above fan 20. In this embodiment, exhaust opening 50 is configured centrally in the top of housing 10. The size of exhaust opening 50 is configured to allow maximum airflow to exit housing 10.

As seen in FIG. 1 is a unidirectional gate or valve 30. Valve 30 is fixedly attached to housing 10 and fully covering exhaust opening 50. Valve 30 may be actuated by any means including but not limited to electromagnetic, mechanical, spring, gravity, or air pressure. When activated valve 30 opens to allow air to escape. When deactivated valve 30 closes, which prevents fumes from escaping and prevents insects from entering through exhaust opening 50. In the first embodiment, I contemplate valve 30 being actuated by the air pressure created when fan 20 is activated.

As part of valve 30, a valve flap 31 is movably attached to valve 30 and can be of any lightweight material such as rubber or plastic. Valve flap 31 is configured to open, or push upwards, when the activated fan creates sufficient air pressure within the interior of housing 10. Valve flap 31 is also configured to close, or drop down due to gravity, when the fan stops and air pressure within the interior of housing 10 drops to the atmospheric pressure.

Figure 6:
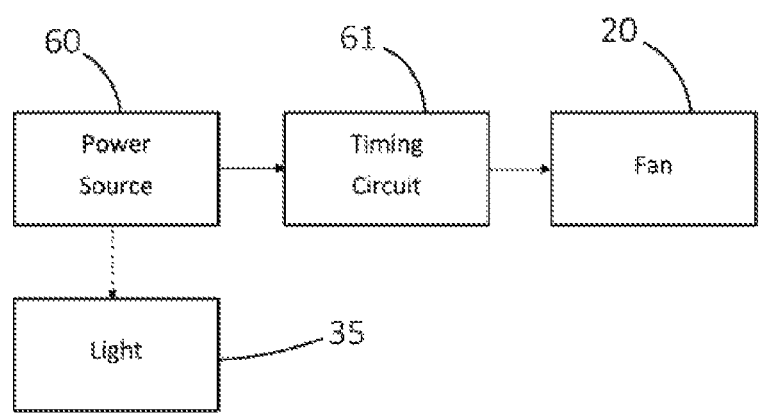
FIG. 6 is a block diagram of the control circuit.

FIG. 6 shows a block diagram of the electrical components and connections of the insect trap. A power source 60 is electrically connected to a timing circuit 61. The timing circuit is electrically connected to fan 20, thereby controlling fan 20. Alternate embodiments allow the use of a light source electrically connected directly to power source 60. As seen in FIG. 3 (side view), power source 60 and timing circuit 61 are mounted adjacent to fan 20 and to the interior of housing 10. At present I contemplate power source 60 to be a DC battery but other sources are acceptable including, but not limited to, AC power cord and solar power cells. Timing circuit 61 can be of any chip, programmable logic chip, or set of electrical components arranged and configured to provide periodic power to fan 20.

Preferred Embodiment—Operation

The preferred embodiment operates in a manner sufficient to attract and contain insects. Components and parts, as detailed above, are configured to lure insects and trap insects within. A more detailed description of the operation follows.

Referring to FIG. 2, container 15 is configured to be easily removed from housing 10. When removed, container 15 is filled with attractant 16 and then connected back to housing 10.

Activating the power source 60 (FIG. 3) using a conventional power button (not shown) starts timing circuit 61, thereby turning on the insect trap.

Timing circuit 61 will cycle between two states: an active-state and an inactive-state. In the first embodiment, the active-state will energize fan 20 for a length of time between 0.5 seconds and 5 seconds. The inactive-state will follow, thereby stopping fan 20 for a length of time between 30 seconds and 1 hour. Timing circuit 61 will continue this cycle until the device is turned off by the user by the conventional power button.

Referring to FIG. 3 is a side view of the first embodiment in the inactive-state. During the inactive-state the current, or airflow, is paused and fumes from attractant 16 pass through insect passage 52 and exit through insect opening 51. Nearby insects 40 converge around insect opening 51 to investigate the fumes. A closed valve 30 will ensure no fumes exit through exhaust opening 50. Nearby insects 40 may land on the device and enter insect opening 51 without being deterred from an active current of air. These interior insects 41 that continue through insect passage 52 are thus within container 15. Interior insects 41 may fall into attractant 16 or continue their mobility where they have a high probability of encountering attractant 16, thus becoming ensnared. Therefore, unlike some prior art, this insect trap is effective in trapping insects without being activated.

Figure 4:
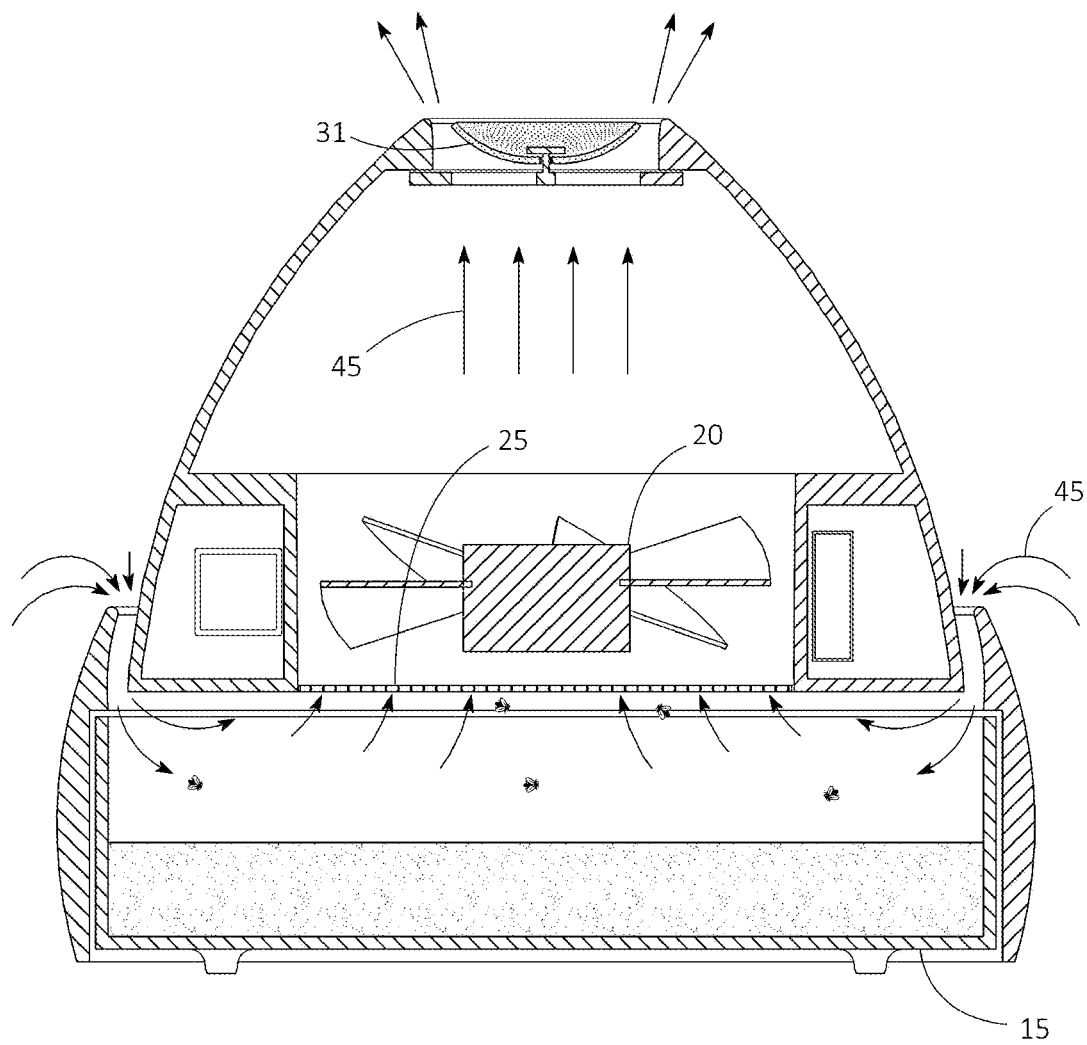
FIG. 4 is another front view of FIG. 3 with the fan motor in the active-state, the exhaust valve open, and with arrows to indicate airflow path.

Referring to FIG. 4 is the first embodiment during the active-state. The path of the airflow is represented as directional arrows 45. An airflow current is created from the activation of fan 20. Negative air pressure within container 15 draws insects through insect opening 51 and through insect passage 52 (FIG. 3). The airflow path 45 continues through screen 25 where insects are retained. The airflow path 45 passes fan 20 and creates positive air pressure within housing 10. This, in turn, pushes valve 30 open. Valve flap 31 is therefore pushed upward to allow the air to escape back to the atmosphere.

As the cycle continues the inactive-state follows (FIG. 3). Timing circuit 61 stops fan 20, thereby stopping the airflow current. Gravity returns valve flap 31 to its closed state. Thus, fan 20 is protected between screen 25 and valve 30, and avoids undue contamination that some prior art experienced. As the airflow stops, interior insects 41 are released from screen 25 and fall into attractant 16 where they become ensnared. The ensnared insects 42 may then be cleaned from container 15 along with attractant 16. The configuration of insect passage 52 and short delay in timing circuit 61 will ensure any interior insects 41 still mobile within container 15 do not escape. This cycle is then repeated until power is turned off by the user.

Alternative Embodiment—Description

Figure 7:
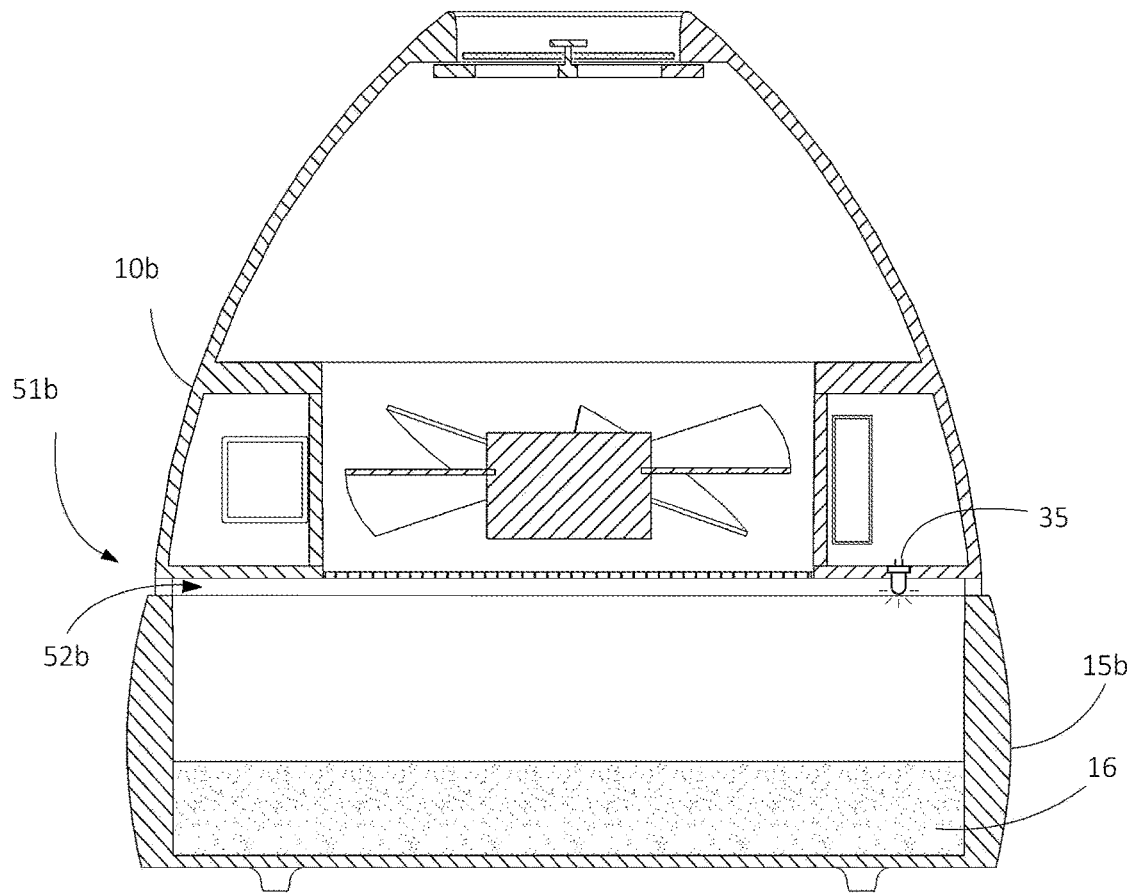
FIG. 7 is a front view, in longitudinal section in accordance to another embodiment.
Figure 8:
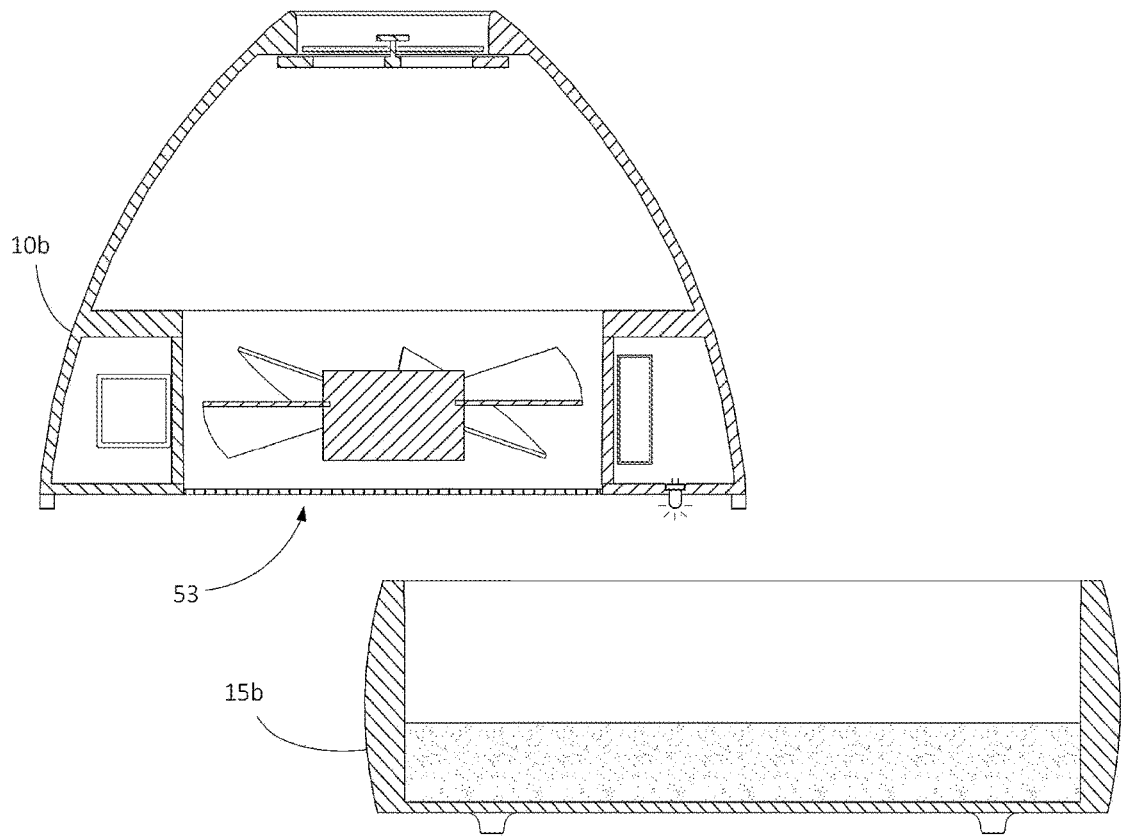
FIG. 8 is another view of FIG. 7 with the collection bin detached.

In a second embodiment, as seen in FIG. 7 (container attached) and FIG. 8 (container detached), an alternate configuration of the housing and container are used. An alternate container 15b is removably mounted to the outside and underneath an alternate housing 10b. A path or interstitial passage 52b is created between alternate container 15b and alternate housing 10b. Interstitial passage 52b is generally horizontal however other configurations are possible.

In this embodiment, a light source 35 is used as an extra source of attraction. Light source 35 is affixed to the bottom of alternate housing 10b and adjacent to screen 25. Light source 35 is configured as to direct light into the top of alternate container 15b. Light source 35 can be of various types including but not limited to ultra violet, incandescent, and Light Emitting Diodes (LED). The use of light source 35 provides an additional lure, as both a visual attractant and a heating source for attractant 16, which will increase the effectiveness of attractant 16.

Alternative Embodiment—Operation

Referring to FIG. 7 and FIG. 8, during the inactive-state fumes travel from container 15b and through interstitial passage 52b. Fumes then exit the insect trap through an alternative insect opening 51b. This alternative insect opening 51b fully surrounds the perimeter of the insect trap. In addition to fumes, light from the light source 35 will exit through alternative insect opening 51b to entice insects. During the active-state air and insects are drawn into alternative insect opening 51b and through interstitial passage 52b and into alternate container 15b.

As described in the preferred embodiment, insects are therefore trapped by screen 25 and ensnared by attractant 16. This configuration allows for a using less material and fewer connective components. Thus, a more basic and less expensive insect trap is created.

CONCLUSION, RAMIFICATIONS, AND SCOPE

Accordingly, the reader will see that, as stated in one embodiment of the invention, I have provided an effective insect trap from the configuration of the components and the airflow created within. Furthermore, the insect trap has the advantages that
provides a safe trapping system for use in any environment such as outdoor patios or inside the home;
provides a compact, simple, and sleek device for discrete operation;
provides an economical system with few components;
allows the clean trapping and removal of insects through a convenient container and liquid attractant;
allows the trapping of insects even while the insect trap is turned off;
and, due to the screen and valve, ensures a clean device without contamination of moving parts;

Although the insect trap has been explained in relation to these embodiments, it is to be understood that other modifications to the equipment and variations to the methods can be accomplished without departing from the scope. For example, in the first embodiment housing 10 may be constructed from multiple connecting parts. This could include a lower housing and upper housing where insect passage 52 passes between the two housing parts.

The invention claimed is:
1. An insect trap comprising:
 (a) a housing with an exhaust opening and an intake opening;
 (b) a screen mounted to said housing and fully covering said intake opening;
 (c) a unidirectional valve mounted to said housing and fully within said exhaust opening;
 (d) a container removably attached to said housing and located below said intake opening and defined by an open top;
 (e) a liquid attractant located within said container;
 (f) an annular insect passage directed into said container;
 (g) a centrifugal fan mounted within said housing to direct airflow from said insect passage, into said container, through said screen, and out through said valve;
 (h) a means of electrically powering said fan;
 (i) and a fan controller device selected from the group consisting of timing circuits and programmable logic chips.
2. The insect trap of claim 1 wherein said container is mounted inside said housing.
3. The insect trap of claim 2 wherein said insect passage passes through said housing.
4. The insect trap of claim 1 wherein said container is mounted outside said housing.
5. The insect trap of claim 4 wherein said insect passage is located between said housing and said container.
6. A method for trapping insects comprising the steps of:
 (a) providing a housing having an exhaust opening, a fan disposed within, and an intake opening;
 (b) providing a unidirectional valve mounted within said exhaust opening;
 (c) providing a screen mounted within said intake opening;
 (d) providing a container and connecting said container to said housing;
 (e) providing liquid insect attractant to be placed inside of said container;
 (f) providing an insect passage above said container whereby fumes from said attractant exit through said insect passage;
 (g) providing an unrestricted airpath in which air can flow in from said insect passage, into said container, through said screen, through said fan and out said unidirectional valve;
 (h) providing a timing circuit that momentarily activates said fan and creating an airflow current, whereby the airpath directs insects into said container and onto said screen;

(i) and providing said timing circuit with a state of deactivation, whereby the airflow ceases and insects are released from said screen and become ensnared in said attractant.

7. The method of claim 6, wherein said container is mounted inside said housing.

8. The method of claim 7 wherein said insect passage is located on the perimeter of said housing and through said housing.

9. The method of claim 6 wherein said container is mounted outside said housing.

10. The method of claim 9, wherein said insect passage is located interstitially between said container and said housing.

\* \* \* \* \*